United States Patent [19]

Suzuki et al.

[11] Patent Number: 4,935,761
[45] Date of Patent: Jun. 19, 1990

[54] CAMERA

[75] Inventors: Toyotoshi Suzuki, Tokyo; Noboru Tanaka, Kanagawa, both of Japan

[73] Assignee: Cannon Kabushiki Kaisha, Tokyo, Japan

[21] Appl. No.: 332,367

[22] Filed: Mar. 31, 1989

Related U.S. Application Data

[63] Continuation of Ser. No. 941,074, Dec. 12, 1986, abandoned.

[30] Foreign Application Priority Data

Dec. 14, 1985 [JP] Japan .................... 60-192813[U]
Jan. 29, 1986 [JP] Japan .................... 61-010398[U]

[51] Int. Cl.$^5$ ............................................. G03B 17/02
[52] U.S. Cl. ................................................. 354/288
[58] Field of Search ............................. 354/288, 202

[56] References Cited

U.S. PATENT DOCUMENTS

| 2,029,913 | 2/1936 | Crumrine | 354/288 |
| 3,165,991 | 1/1965 | Yoshida | 354/288 X |
| 3,602,118 | 8/1971 | Oberheim | 354/288 |
| 4,313,664 | 2/1982 | Finnemore | 354/288 |
| 4,317,628 | 3/1982 | Shimizu | 354/288 |
| 4,432,621 | 2/1984 | Suzuki et al. | 354/288 X |

FOREIGN PATENT DOCUMENTS

| 1533837 | 6/1968 | France | 354/288 |
| 150837 | 9/1982 | Japan | 354/288 |
| 390679 | 8/1965 | Switzerland | 354/288 |

Primary Examiner—Donald A. Griffin
Attorney, Agent, or Firm—Fitzpatrick, Cella, Harper & Scinto

[57] ABSTRACT

There is disclosed a camera which makes use of a packed battery having a recess portion on a central part of one of its side walls to prevent the packed battery from being mounted incorrectly in the body of the camera, in which a chamber for housing the packed battery is arranged at a forwardly inclined position so that the packed battery housed in the chamber snugly fits at its recess portion to an arcuate outside surface of a spool chamber or a winding chamber formed in the camera body. A battery cover for the battery chamber is fixed onto the camera by a set screw or screws, and a strap holding portion and a rear cover stopper of the camera are integrally formed on said battery cover.

18 Claims, 2 Drawing Sheets

CAMERA

This application is a continuation of application Ser. No. 941,074, filed Dec. 12, 1986, now abandoned.

BACKGROUND OF THE INVENTION

1. Field of the Invention

The present invention relates to a camera which makes use of a packed battery.

2. DESCRIPTION OF THE RELATED ART

Recently, a lithium battery has become widely used as a power source of a camera. The lithium battery has a large capacity and therefore, if the lithium battery was mounted incorrectly in the camera significant problems could occur. In order to prevent the occurrence of such problems a so-called packed battery, as indicated by 1 in FIG. 4, is generally used. The packed battery 1, as mentioned above, is so constructed that two cylindrical lithium batteries are packed in a case made of plastic material and a positioning recess portion 1a is formed on a central part of one of its side walls, to prevent the packed battery from being mounted incorrectly in the camera. The packed battery has terminals 1b and 1c.

The packed battery is disposed in a battery chamber which is located outside of a spool chamber 102a (or a film winding chamber 102b) formed on a camera body 102 in side-by-side relationship with said chamber 102a (or 102b). A battery positioning convex portion 102e is formed on the camera body 102 and it is arranged to engage with the battery positioning recess portion 1a of the packed battery 1 to prevent said packed battery from being mounted incorrectly in the battery chamber.

The above-mentioned battery positioning convex portion 102e forms a locally thick wall which has a thickness larger than that required to mount a battery cover 106. Accordingly, some problems, such as shrinkage, irregularity in luster or the like may occur in molding of the camera body. Furthermore, owing to the existence of such a thick wall, the distance between the center O1 of the spool chamber 102a (or winding chamber 102b) and the center O2 of the battery chamber is increased and, consequently, the overall size of the camera is increased.

SUMMARY OF THE INVENTION

It is a first object of the invention to provide a camera in which the above-mentioned defects of the conventional camera using the packed battery are avoided.

With this object, the present invention provides a camera which makes use of a packed battery having a recess portion on a central part of one of its side walls to prevent the packed battery from being mounted in incorrectly in the camera, in which a chamber for housing the packed battery is arranged at a forwardly inclined position so that the packed battery housed in said chamber snugly fits at its recess portion to an arcuate outside surface of a spool chamber or a winding chamber formed in the camera.

In view of the fact that a lithium battery in the packed battery has a large capacity, so that the camera can be used for long period of time, it is a second object of the present invention to provide a camera particularly suitable to the construction in which the lithium battery is used.

With this object the present invention provides a camera in which a battery cover for the above-mentioned battery chamber is fixed by means of a screw or screws. A strap holding portion and a stopper for a rear cover of the camera are integrally formed on said battery cover, whereby the number of parts constituting the camera is considerably decreased.

The other objects of the present invention will be understood from the descriptions of the preferred embodiments of the invention which will be made with reference to the drawings.

DETAILED DESCRIPTION OF THE PREFERRED EMBODIMENTS

Now, the preferred embodiments of the present invention will be described with reference to the drawings.

Figure 1:
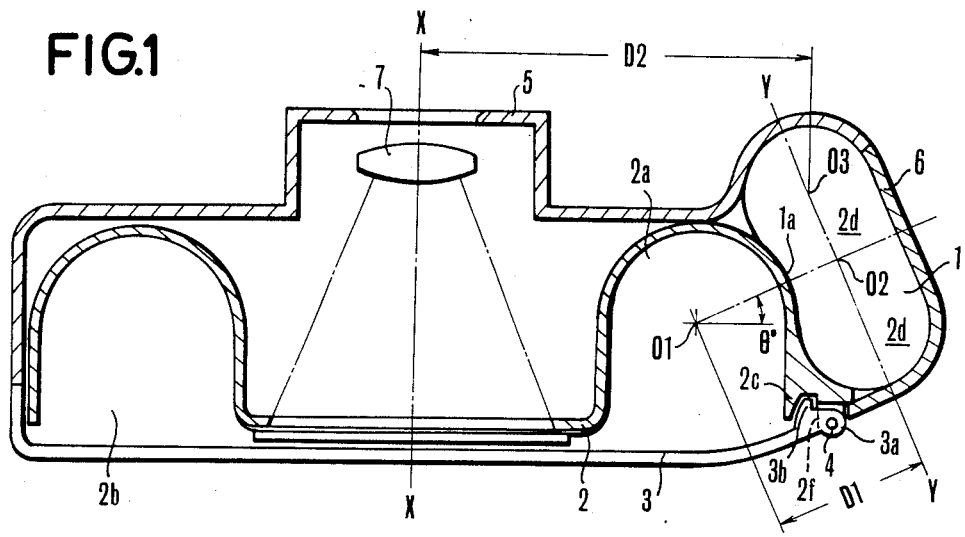
FIG. 1 is a schematic sectional view showing a first embodiment of the camera according to the present invention.

FIG. 1 is a schematic sectional view showing a first embodiment of the present invention. In FIG. 1, the packed battery as mentioned above is indicated by numeral 1.

The camera includes a camera body 2 having a spool chamber 2a, a film cartridge chamber 2b, a hinge portion 2f, a battery chamber 2d and a light shielding rib 2c which are formed as an integral body. The camera includes a rear cover 3 having a hinge 3a at one end, which is pivotally mounted on the hinge portion 2f of the camera body, whereby the rear cover can be opened and closed relative to the camera body. The camera further includes a front cover 5, a battery cover 6 and a photographic lens 7.

The present invention takes advantage of the fact that the arcuate convex shape of the outside surface of the spool chamber 2a and the arcuate concave shape of the recess portion 1a of the packed battery 1 are of substantially same curve, as clearly seen from FIG. 1, and the battery chamber 2d is so arranged that said arcuate convex shape of the packed battery snugly fits to said arcuate convex shape of the spool chamber.

Figure 5:
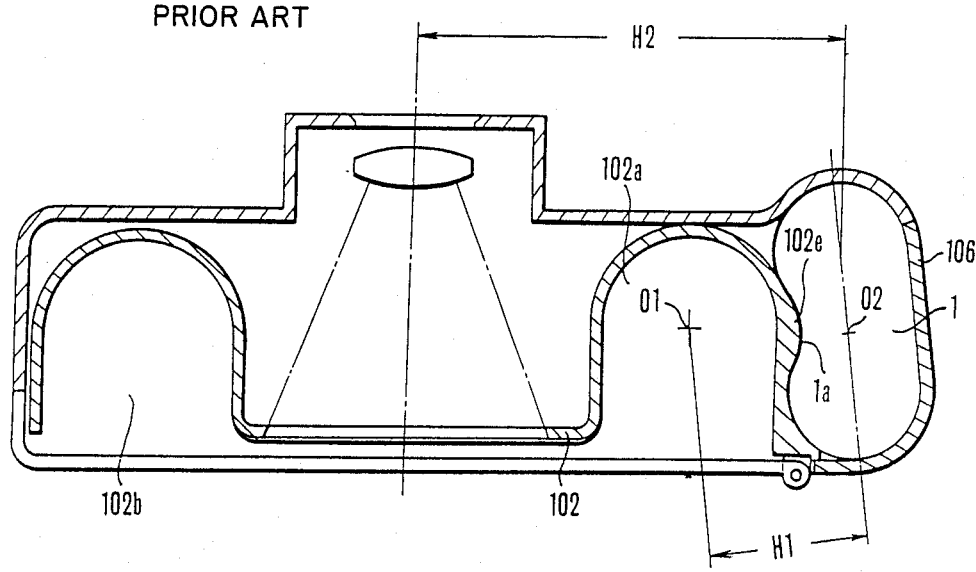
FIG. 5 is a schematic sectional view showing a conventional camera using a packed battery.

In order to attain such arrangement of the battery chamber, the center O2 of the battery chamber 2d is displaced in a forward direction by an angle $\theta$, as compared with the conventional arrangement as shown in FIG. 5. Accordingly, a center line Y—Y of the battery chamber 2d is forwardly inclined by the angle $\theta$ toward an optical axis X—X. Thus the battery chamber is displaced as a whole in forward direction.

In the above explanation, the chamber 2a was described as a spool chamber, while the chamber 2b was described as a winding chamber. It is, however, possible to form said chamber 2a as a winding chamber and said chamber 2b as a spool chamber.

The above construction provides the following advantages over the conventional construction shown in FIG. 5.

(1) It is not necessary to form the battery positioning convex portion 102c and, consequently, the camera body 2 can be formed having a uniform thickness.

(2) A distance D1 between the center O1 of the spool chamber 2a and the center O2 of the battery chamber 2d can be decreased, as compared with the distance H1 in the conventional construction, so that the overall size of the camera can be decreased.

(3) The battery chamber 2d is displaced to the front and inclined toward the optical axis and, consequently, feeling of holding the camera is improved.

(4) The space required to arrange the rear cover hinge portion be increased, so that light shielding ribs 2c and 3b can be formed on the camera body and the rear cover. Thus, a light shielding member, which has been heretofore required, may be omitted.

(5) The distance D2 between the center O3 of the battery chamber at the front side thereof and the optical axis X—X is shorter than a corresponding distance H2 of the conventional construction, which is advantageous in designing a camera.

(6) If the amount of the battery chamber protruding toward an object to be photographed is designed to be smaller than a protruding amount of a lens barrel, the overall thickness of the camera can be held to be substantially equal to that of the conventional camera.

Figure 2:
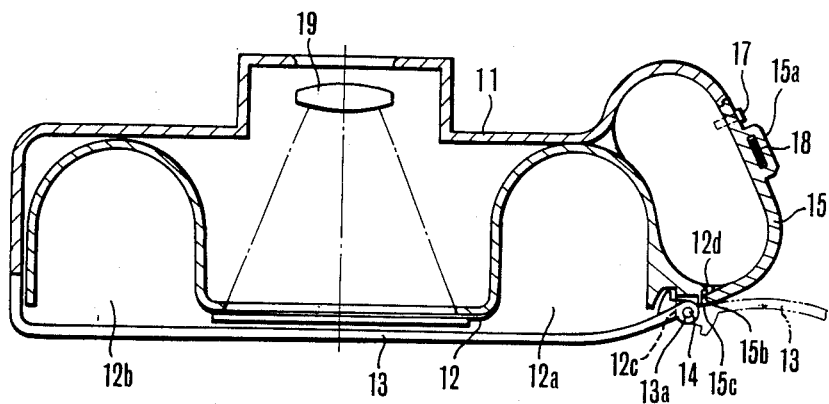
FIG. 2 is a schematic sectional view showing a second embodiment of the camera according to the present invention.

FIG. 2 is a schematic sectional view showing a second embodiment of the camera according to the present invention. Referring to FIG. 2, a camera 11 has a camera body 12 constituting a constructing member of the camera. The camera body 12 includes a spool chamber 12a and a film cartridge chamber 12b, in the same manner as in the first embodiment. A hinge portion 12c and a battery cover engaging groove 12d are formed at an end of said spool chamber 12a. A rear cover 13 has a hinge portion 13a at its one end and it is pivotally held by means of a shaft 14 on the hinge portion 12c of said camera body 12. The rear cover can be swung between a closed position as indicated by a solid line and an open position as indicated by a dot-and-dash line.

Figure 3:
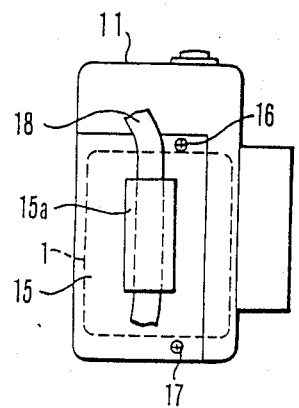
FIG. 3 is a right side view of the camera shown in FIG. 2.
Figure 4:
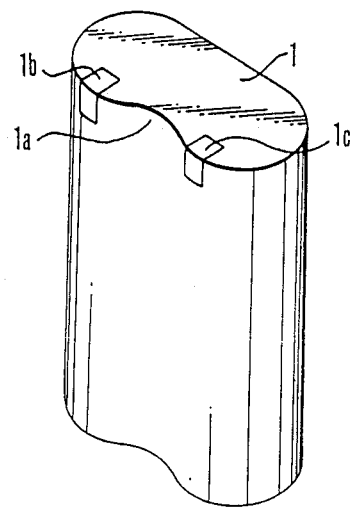
FIG. 4 is a perspective view showing a packed battery for use in the camera according to the present invention.

A battery cover 15 is arranged to cover a packed battery 1. A strap holding portion 15a is integrally formed on a central part of the outside surface of the battery cover 15. A pawl 15b is integrally formed at one end of said battery cover 15 and also a rear cover stopper 15c is integrally formed at said one end to stop the rear cover at its opened position. When mounting the battery cover 15 on the camera body, the pawl 15b is engaged into the groove 12d formed in the camera body 12 and then the other end of the battery cover is fixed to the camera body 12 by means of set screws 16 and 17, as shown in FIG. 3. A strap 18 is passed through said strap holding portion 15a and both ends of said strap 18 are connected to end portions (not shown) of the camera, so that the strap cannot be disconnected from the camera.

In FIG. 2, the camera includes a photographing lens as indicated by the numeral 19, and the packed battery 1, which is same as that shown in the first embodiment, is housed in a battery chamber formed in the camera body 12 in the same manner as in the first embodiment.

According to the construction as described above, the battery cover 15 is fixed by means of the screws 16 and 17 and even if the strap holding portion 15a integrally formed on the battery holder 15 or the rear cover stopper 15c is subjected to strong force applied by the strap 18 or the rear cover 13, the battery cover 15 is firmly held in a fixed state.

In this regard it is to be noted that the lithium battery used in the packed battery has a large capacity, so that the camera can be used for a long period of time, without requiring exchange of packed batteries. Accordingly, the construction in which the battery cover 15 is fixedly mounted on the camera body by means of the screws 16 and 17 presents no disadvantage in practical use.

It will be understood that the present invention provides a camera which makes use of a packed battery having a recess portion on a central part of one of its side walls to prevent the packed battery from being mounted incorrectly in the body of the camera, in which a chamber for housing the packed battery is arranged a forwardly inclined position so that the packed battery housed in the chamber snugly fits at its recess portion to an arcuate outside surface of a spool chamber or a winding chamber formed in the camera body. The present invention further provides a camera which makes use of a packed battery in which a battery cover is fixedly mounted on the body of the camera by means of a set screw or screws and a strap holding portion and a rear cover stopper of the camera are integrally formed on said battery cover. Thus various improvements are provided in the a camera which makes use of the packed battery, allowing the battery cover to withstand mechanical forces which may be applied decreasing number of parts of the camera and improving space efficiency.

What is claimed is:

1. A camera making use of a packed battery having a recess portion comprising:
    a chamber for housing a film cartridge;
    a chamber for housing a spool, wherein one of said film cartridge housing chamber and said spool housing chamber has a curved portion, the inside and outside surfaces of which are curved; and
    a chamber for housing the packed battery which is so arranged such that the recess portion of the packed battery snugly fits at said curved outside surface of said one of said film cartridge housing chamber and said spool housing chamber.

2. A camera according to claim 1, further comprising an openable cover for covering said packed battery housing chamber, said openable cover being mounted on the body of the camera by means of at least one set screw.

3. A camera according to claim 2, further comprising:
    a strap holding portion integrally formed on said openable cover.

4. A camera according to claim 3, further comprising:
    a rear cover stopper integrally formed on said openable cover.

5. A camera according to claim 2, further comprising:
    a rear cover stopper integrally formed on said openable cover.

6. A camera according to claim 1, wherein said battery housing chamber and said one of said film cartridge housing chamber and said spool housing chamber share a common wall having a uniform thickness opposite said recess portion.

7. A camera according to claim 6, wherein said the inside and outside surfaces are arcuate in shape.

8. A camera according to claim 7, wherein the inside and outside surfaces form portions of concentric circles.

9. A camera comprising:

a battery cover mounted on a body of the camera by means of at least one screw and one engaging member; and a strap holding portion integrally formed on said battery cover.

10. A camera according to claim 9, further comprising:

a rear cover stopper integrally formed on said battery cover.

11. A camera comprising:

a battery cover mounted on a body of the camera by means of at least one set screw and one engaging member; and a rear cover stopper integrally formed on said battery cover.

12. A camera comprising:

a first chamber for housing an element, said first chamber having an curved portion the inner and outer surfaces of which are curved; and a second chamber for housing a battery, said second chamber having a concave portion formed along the curved portion of said first chamber.

13. A camera according to claim 12, further comprising an opening and closing lid for said second chamber, and a screw for attaching said lid to said second chamber.

14. A camera according to claim 13, further comprising a strap-holding portion integrally provided on said lid.

15. A camera according to claim 13, further comprising:

a lid for said first chamber; and a stopper, integrally formed on said opening and closing lid, for said first chamber lid.

16. A camera according to claim 12, further comprising a wall common to said first and second chambers and having a substantially uniform thickness at the concave portion of said second chamber and the curved portion of said first chamber.

17. A camera according to claim 12, wherein said curved portion is arcuate in shape.

18. A camera according to claim 17, wherein the inner and outer surfaces form portions of concentric circles.

* * * * *

UNITED STATES PATENT AND TRADEMARK OFFICE
CERTIFICATE OF CORRECTION

PATENT NO. : 4,935,761

DATED : June 19, 1990

INVENTOR(S) : Toyotoshi SUZUKI, ET AL.

It is certified that error appears in the above-identified patent and that said Letters Patent is hereby corrected as shown below:

COLUMN 1:

Line 14, "and" should read --and,--;

Line 15, "camera" should read --camera,--;

Line 17, "problems" should read --problems,--; and

Line 53, "in" should be deleted.

COLUMN 4:

Line 29, "applied" should read --applied,--.

COLUMN 5:

Line 2, "one screw" should read --one set screw--; and

Line 19, "an" should read --a--.

Signed and Sealed this

Thirtieth Day of June, 1992

*Attest:*

DOUGLAS B. COMER

*Attesting Officer*     *Acting Commissioner of Patents and Trademarks*